United States Patent [19]

Herod et al.

[11] Patent Number: 5,167,980

[45] Date of Patent: Dec. 1, 1992

[54] HORIZONTAL EXTRUSION OF EDGE RIPPLED SNACK PRODUCT

[75] Inventors: David P. Herod, Irving; Nancy J. Moriarity, Dallas, both of Tex.

[73] Assignee: Recot, Inc., Plano, Tex.

[21] Appl. No.: 690,666

[22] Filed: Apr. 24, 1991

[51] Int. Cl.⁵ .................................. A23L 1/00
[52] U.S. Cl. ...................... 426/496; 426/503; 426/516; 426/808
[58] Field of Search ............... 426/496, 502, 503, 516, 426/517, 439, 808; 425/396

[56] References Cited

U.S. PATENT DOCUMENTS

| | | | |
|---|---|---|---|
| 2,489,121 | 11/1949 | Collins | 425/396 |
| 2,799,896 | 7/1957 | Grow et al. | 425/377 |
| 3,212,461 | 10/1965 | Fritzberg | 425/377 |
| 4,276,317 | 6/1981 | Hayashi | 426/517 |

*Primary Examiner*—George Yeung
*Attorney, Agent, or Firm*—Rothwell, Figg, Ernst & Kurz

[57] ABSTRACT

A dough strip extruder, such as a lasagna noodle extruder, for extruding one or more riple edge strips is oriented to extrude the strips horizontally. The extruded strips are supported as they leave the extruder to maintain the strips in the horizontal plane of the extrusion passageway for a distance sufficient to allow complete formation of the undulations on the edges. The support may be by a roller, cylindrical rod, or horizontal plate.

6 Claims, 4 Drawing Sheets

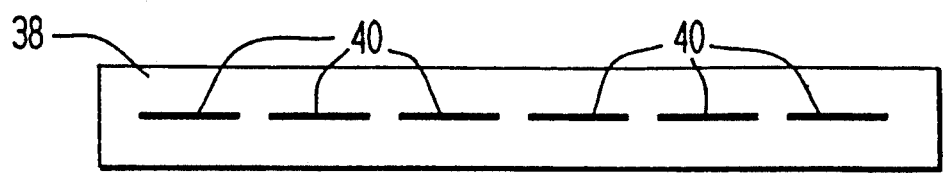
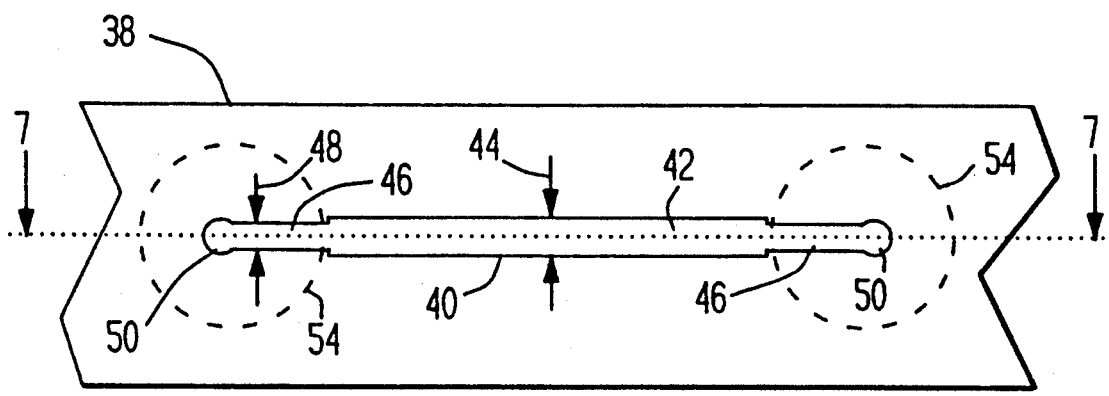
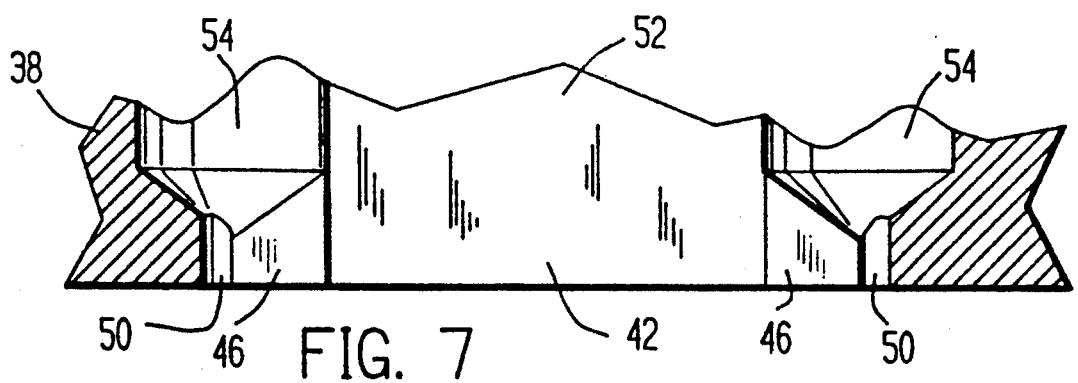
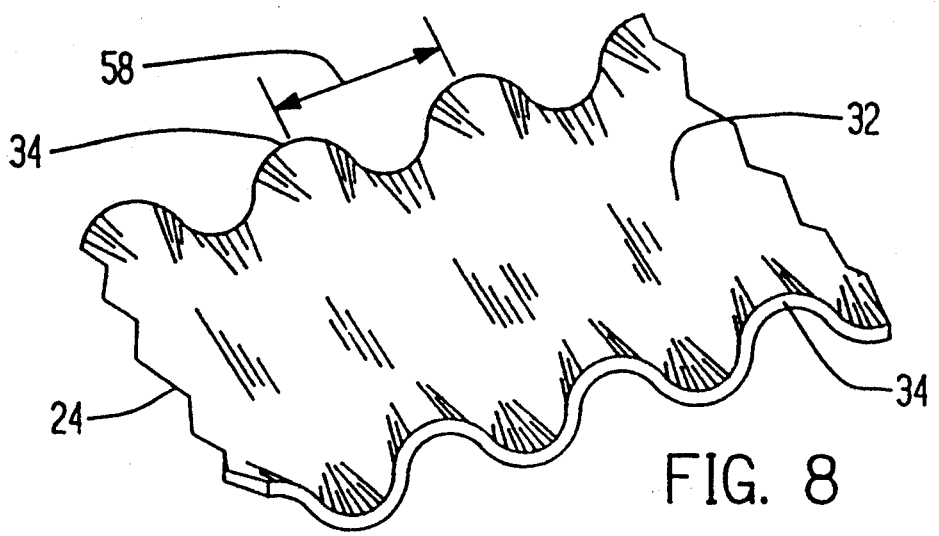

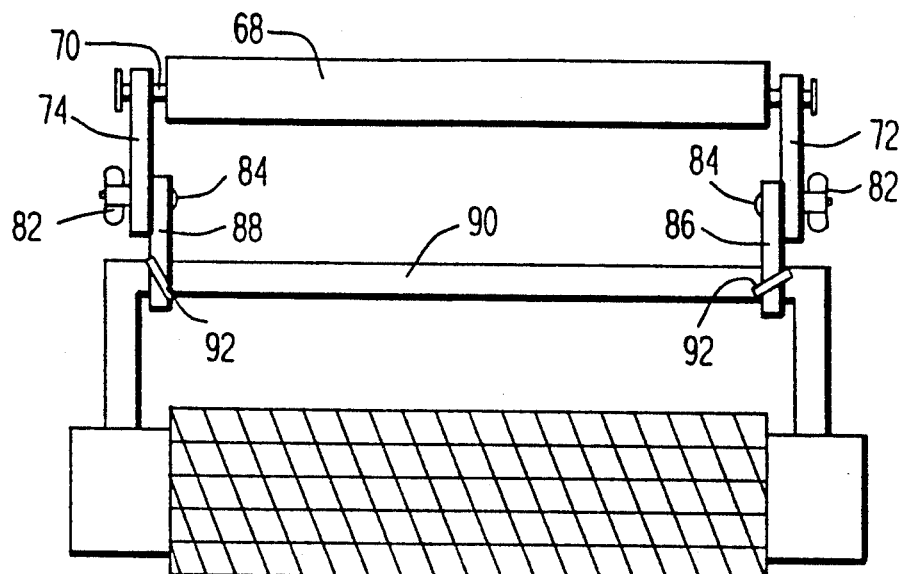
FIG. 9
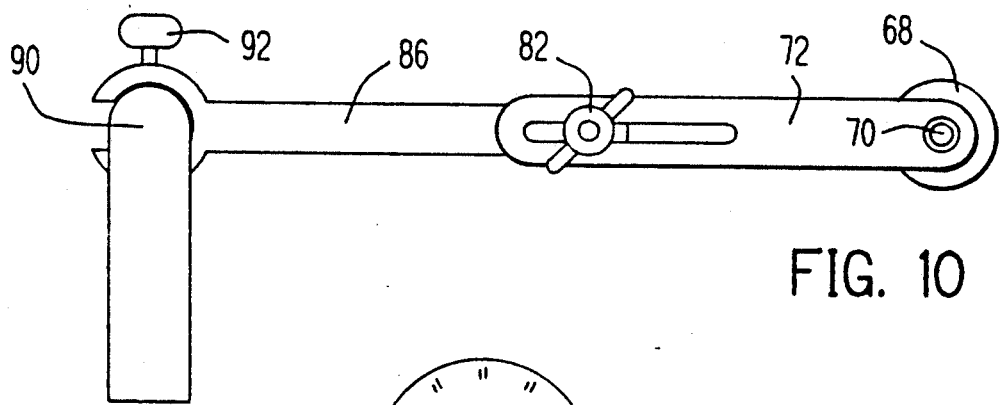
FIG. 10
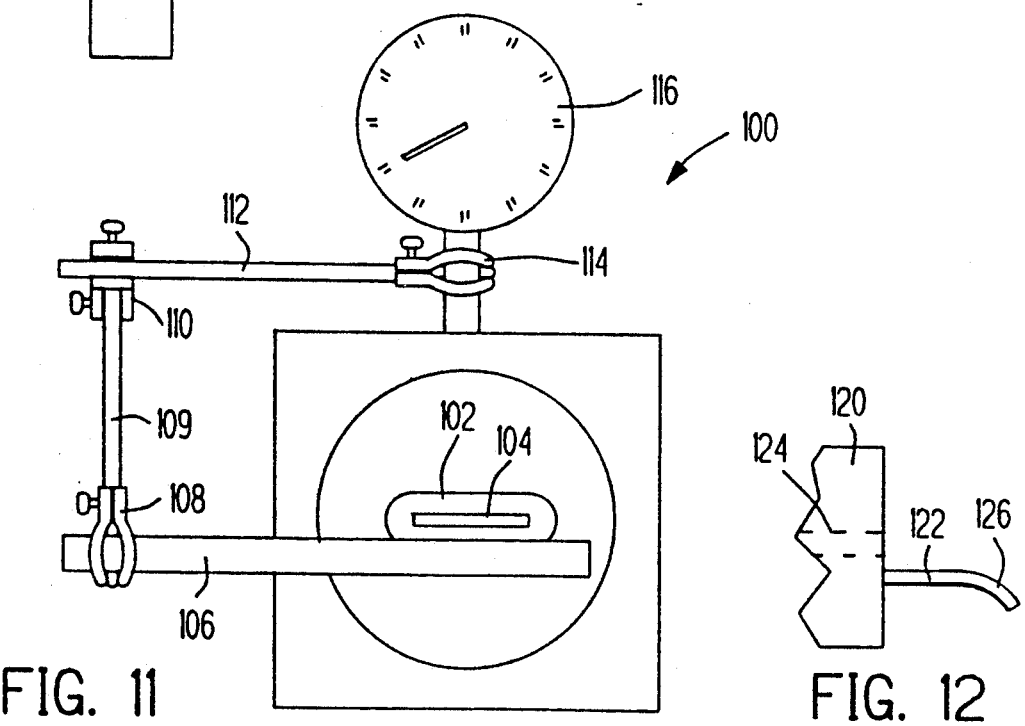
FIG. 11
FIG. 12

HORIZONTAL EXTRUSION OF EDGE RIPPLED SNACK PRODUCT

TECHNICAL FIELD

The invention relates to methods and apparatus for the extrusion of strip food products which have undulating or rippled edges, and particularly to extrusion in a horizontal plane.

BACKGROUND ART

Extrusion of food strip products with undulating edges, such as lasagna noodles, is performed by dies which have strip extruding passageways designed to extrude the edge portions of the strips at a greater velocity than the central portions of the strips so that the edges undulate. Generally the greater velocity of the edge portions is produced by contouring the passageways to have reduced resistance to the flow of the dough at the edges of the passageways.

One type of prior art lasagna extrusion passageway has an elongated narrow orifice which includes a rectangular central portion of a first width, end rectangular portions of a second width which is less than the first width, and terminating circular portions of a diameter slightly larger than the second width. The larger central portion of the extrusion passageway extends substantially through the die. Large diameter bores extend from the rear of the die and the edge portions of the extrusion passageway open into these bores to substantially reduce the length of the edge portions of the extrusion passageway. The reduced length of these edge portions results in reduced resistance to flow of the dough to produce the undulation of the edges of the strip of dough as it is extruded. The circular terminating portions of the die slit provide reduced flow resistance to compensate for edge resistance which otherwise could produce tearing or non-uniform flow of the edges of the extruded strip.

Prior art lasagna extrusion dies have their extrusion passageways extending downward in a vertical plane so that the lasagna strips are extruded downward in the vertical plane. The extrusion velocity is relatively slow and the lasagna noodles are severed by a cutting tool moving across the face of the extrusion die.

In the manufacture of salty segmented strip snack products such as snack chips, a higher rate of extrusion, compared to lasagna noodle extrusion, is desirable to make practical quantities of product. At such higher rates of extrusion, cutting the segments by wiping a cutting tool across the face of the die is impractical since the segments are distorted by the cutting tool. Extruding and cutting the strip dough products on a horizontal conveyor avoids the distortion of the snack segments. When horizontal extrusion of edge undulating strips is attempted, the undulations are highly irregular, and randomly spaced.

SUMMARY OF INVENTION

The present invention is summarized in a method and apparatus for producing strips of food product with undulating edges, wherein a strip of dough is extruded horizontally from an edge-ripple-forming extrusion die, and the extruded strip is supported adjacent the extrusion die so that the undulating edges are formed with a steady frequency.

An object of the invention is to enable the horizontal extrusion of edge rippled dough strips.

Another object of the invention is to enable the horizontal extrusion of edge rippled dough strips.

Another object of the invention is to eliminate irregularity in the edge undulations of a dough strip extruded horizontally from a ripple-forming die.

One advantage of the invention is that segmented snack strips with rippled edges can be produced using conventional horizontal processing equipment.

A feature of the invention is the discovery that the irregularity in undulations formed on the strip edges of a horizontally extruded strip can be eliminated by maintaining the extruded strip in the horizontal plane of extrusion for a short distance in front of the extruding die.

Other objects, advantages and features of the invention will be apparent from the following description of the preferred embodiments taken in conjunction with the accompanying drawings.

BRIEF DESCRIPTION OF DRAWINGS

FIG. 5 is a front elevation of an extrusion die broken away from the apparatus of FIGS. 1 and 2.

FIG. 6 is an enlarged front elevation view of a broken away portion of an extrusion die insert of FIG. 5 showing a single extrusion orifice.

FIG. 7 is a horizontal section view taken at dotted line 7—7 in FIG. 6.

FIG. 8 is a perspective view of a broken away segment of a dough strip extruded by the apparatus of FIGS. 1 and 2.

FIG. 9 is a rear view of a modified portion of an apparatus for producing segmented strip snacks in accordance with the invention.

FIG. 10 is a side elevation view of a support portion of the apparatus of FIG. 9.

FIG. 11 is a front elevational view of a portion of another variation of the apparatus for producing segmented strip snacks in accordance with the invention.

FIG. 12 is a side elevation view of still another variation of the apparatus for producing segmented strip snacks in accordance with the invention.

DESCRIPTION OF THE PREFERRED EMBODIMENTS

Figure 1:
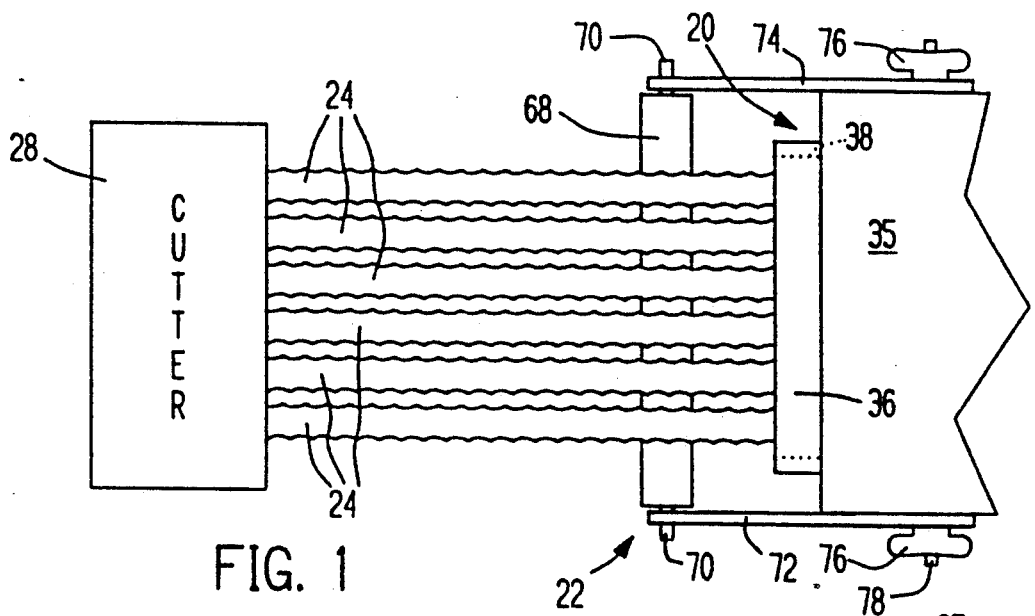
FIG. 1 is top plan view of a broken away portion of an apparatus for producing segmented strip snacks in accordance with the invention.
Figure 2:
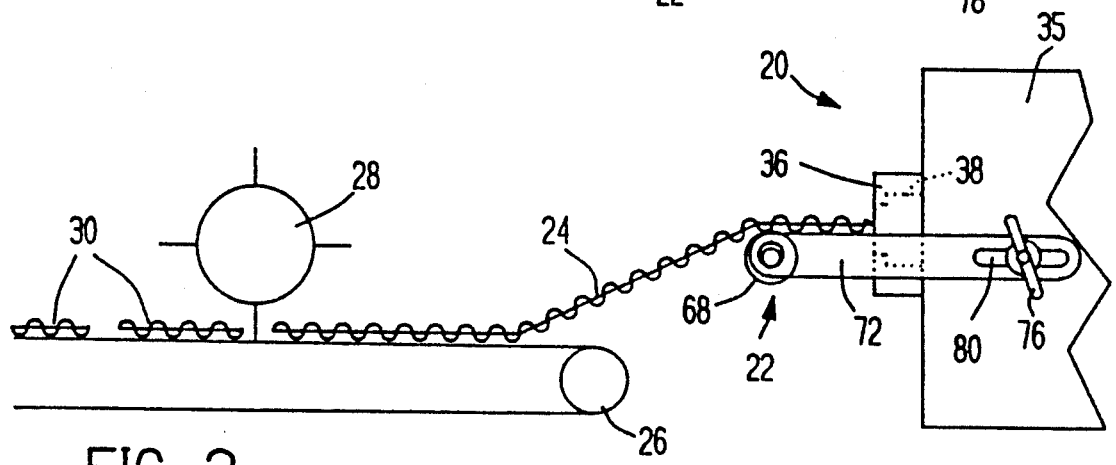
FIG. 2 is a side elevation view of the apparatus of FIG. 1.

As shown in FIGS. 1 and 2, one embodiment of the invention utilizes a horizontally oriented dough strip extrusion mechanism indicated generally at 20 together with a strip support mechanism indicated generally at 22 for supporting a plurality of dough strips 24 in a horizontal plane as the strips are being extruded from the extrusion mechanism 20. The strips 24 are maintained in this horizontal plane for a selected distance until undulations are fully formed on the edges of the strips. It has been discovered that the maintenance of the extruding strips in a horizontal plane results in uniform undulations on the edges of the strips.

The strips 24 are fed by a conveyor 26 to a cutter 28 which cuts the strips into segments 30. Subsequently these severed segments 30 are passed to conventional snack chip processing equipment such as a fryer (not shown) where the segments are cooked, a seasoning mechanism (not shown) where the cooked segments are seasoned such as salted, and packaging mechanism (not shown) where the seasoned segments are packaged for shipment and sale to consumers.

As illustrated in FIG. 8, each of the strips 24 has a flat central portion 32 and edges with undulations 34. The undulations are substantially uniform in amplitude (height above the plane of the central portion 32) and periodicity (spacing between undulations). This results in a pleasing and attractive snack chip. These chips can be made from a variety of flours such as wheat flours, corn flours, etc.

The extrusion mechanism 20 includes a die or extrusion distribution head 35 on which is secured a die plate 36 containing a die insert 38 having a plurality of slit-like orifices 40, FIG. 5, from which the dough strips are extruded. Alternatively there are a plurality of die inserts (not shown) each containing one or more die orifices. The die insert or inserts are formed by conventional techniques such as machining of split halves (not shown). The die insert 38 of FIGS. 1 and 5 is shown as having six extrusion orifices 40; however any number of orifices, for example nine, can be formed in the insert or inserts of an extrusion apparatus.

Each orifice 40, as illustrated in FIG. 6, has a central horizontally elongated rectangular portion 42 of width 44 and edge horizontally elongated rectangular portions 46 of width 48. The width 48 is less than the width 44. At the extreme edges, the orifices 40 terminate in circular portions 50 which have a diameter slightly larger than the width of the portions 46. An extrusion passageway 52, FIG. 7, extends through the die insert 38 along a horizontal plane as represented by dotted line 7—7 in FIG. 6 and communicates with the distribution passage or passages (not shown) in the die head 35. In the front portion of the die insert 38, the extrusion passageway 52 has the same cross section as the orifice 40. The cross section of the central portion 42 extends through the die insert or at least a substantial portion thereof. However the narrower edge portions 46 and circular portions 50 open into large diameter horizontal bores 54 formed in the rear of the die insert.

Since resistance to the flow of the dough in a passageway is dependent upon the length of the passageway as well as the cross-sectional area of the passageway, the outer edges 46 of the passageway 52 have less resistance than the central portion 42. This results in the dough extruding from the edges 46 of the orifice at a faster velocity than the velocity of extrusion from the central portion 42. The circular portions 50 provide a reduction in flow resistance to compensate for edge wall resistance to the flow.

The flow of the dough through the orifice is also a function of the rheological properties of the dough. Generally the preferred rheological properties of the dough are derived empirically. The rheological properties of the dough used for production of segmented snack chips are controlled to produce product with uniform edge undulations.

Figure 4:
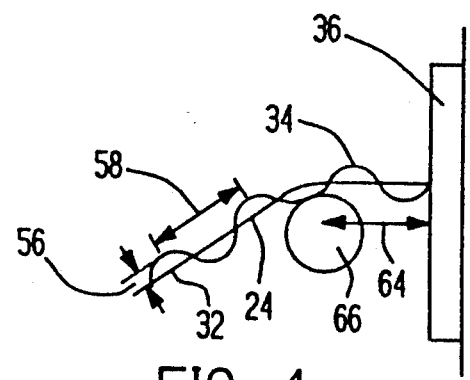
FIG. 4 is a view similar to FIG. 3 but of the apparatus of FIGS. 1 and 2.

The ripple or wave shape of each edge portion has an amplitude 56, FIG. 4, (height above the plane of the central portion 32) and a pitch 58 (longitudinal distance from one peak to the next peak) each determined by the periodicity or frequency of ripple formation and the ratio of the velocities of the center and edge portions of the strip. Assuming each wave's maximum distance to the right or left of the central mass can be approximated by the shape of a triangle, $$a = \sqrt{\left(\frac{P}{4} \times \frac{S2}{S1}\right)^2 - \left(\frac{P}{4}\right)^2} \tag{1}$$

where a is the amplitude 56, P is the pitch 58, S1 is extrusion velocity of the central portion 32, and S1 is the extrusion velocity of the strip edge portions. Similarly, the differential velocity, S2/S1, can be estimated by the equation $$\frac{S2}{S1} = \frac{4 \times \sqrt{a^2 + \left(\frac{P}{4}\right)^2}}{P} \tag{2}$$

when the amplitude and pitch are known. The pitch distance is smaller and/or the corresponding amplitude is larger when the edge/center speed ratio is higher.

The detailed configuration of the extrusion passageways in the above-described extrusion die, except for the horizontal orientation, is similar to conventional vertically oriented lasagna noodle extrusion dies. Also there exist several other conventional vertical lasagna noodle extrusion passageway configurations (not shown) which can be oriented horizontally and substituted for the described extrusion die.

Figure 3:
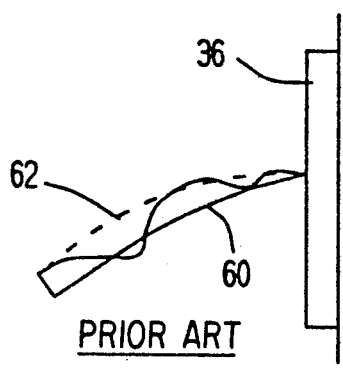
FIG. 3 is an enlarged side elevation view of a broken away portion of a horizontally oriented prior art extrusion apparatus attempting to extrude strips with rippled edges.

When the die is used to horizontally extrude a strip 60 as shown in FIG. 3, the strip has a tendency to fall under the force of gravity to produce a downward curved strip from the die orifice. The greater velocity of the flow of the edge portions of the extruded strip results in a length on the edge which is greater than the length of the central portion of the strip. In normal downward extrusion of lasagna strips, the extra edge length is taken up by the undulations of the edges. Where the strip curves downward from the orifice of the die as shown in FIG. 3, a substantial portion of the extra length in the strip edges is taken up by a larger downward radius of curvature as shown by dashed line 62. This results in the strip edges having large generally one-sided ripples which occur irregularly. For extrusion where the difference between the outer edge velocity and the inner central portion velocity is reduced, all of the extra length can be taken up by the larger circular path of the outer edges to completely eliminate the undulations.

In contrast as shown in FIG. 4, cylindrical member 66 supports the strip 24 in front of the die so that the strip is extruded in a horizontal plane until the ripples 34 are fully formed. Thereafter, the ripples 34 retain their regularity even when the strip 24 is bent through a substantial downward curvature. Generally when only a single bar or roller is employed, the distance 64 of the member 66 from the face of the die is at least equal to or greater than one-half of the period 58. Preferably the distance 64 is two times the period 58 or more. For example the distance 64 can be in the range from 25 to 51 mm (1 to 2 inches).

Referring back to FIGS. 1 and 2, the cylindrical support member may be in the form of a stainless steel or polytetrafluoroethylene roller 68. Axles 70 protruding axially from ends of the roller 68 are journaled in circular openings of arms 72 and 74. These arms are mounted by wing nuts 76 on studs or bolts 78 extending from opposite sides of the extrusion mechanism 20. Conveniently the arms 72 and 74 have slotted openings 80 enabling adjustment of the spacing between the roller 68 and the front of the die 20. The vertical position of the roller 68 can also be adjusted by pivoting the arms 72 and 74 about the bolts 78.

The employment of a roller or rollers for maintaining the extruded strip or strips in a horizontal plane immediately after extrusion has an advantage over a bar or plate in that the rotation of the roller tends to reduce product deformation that would be caused by adherence or sliding friction of the dough strip to a stationary and non-rotating support member.

A modification of the mounting structure for the roller 68 is shown in FIGS. 9 and 10 wherein the arms 72 and 74 are attached by wingnuts 82 and bolts 84 to one ends of respective arms 86 and 88. These arms have their opposite ends slotted to fit on a bar 90 which is mounted over the end of the conveyor 26. Thumb screws 92 on the slotted ends adjustably secure the arms 86 and 88 on the bar 90.

A variation of the apparatus for horizontally extruding a ripple edge strip of dough is generally shown at 100 in FIG. 11. The extrusion die insert 102 contains a single rectangular extrusion slot 104 for extruding a strip in a horizontal plane. The extrusion passageway has conventional facilities (not shown) for forming rippled edges on the strip being extruded. The cylindrical support member of this variation is in the form of a metal rod 106. This rod is adjustably supported by a beaker clamp 108 on a rod 109 connected by dual clamp 110 to rod 112 which is mounted by beaker clamp 114 on the stem of pressure gauge 116 of the extrusion mechanism.

In still a further variation shown in FIG. 12, a horizontal rippled edge dough strip extruder insert die 120 has a horizontal plate 122 mounted, such as by welding, on its face below the orifice of die passageway 124. The distance of the plate below the die orifice is equal to the desired ripple amplitude. The plate 122 extends horizontally from the die face by at least one-half of the undulation pitch distance and preferably in the range from 0.5 to 2.0 times the pitch distance before running downward in the curved edge 126.

Figure 13:
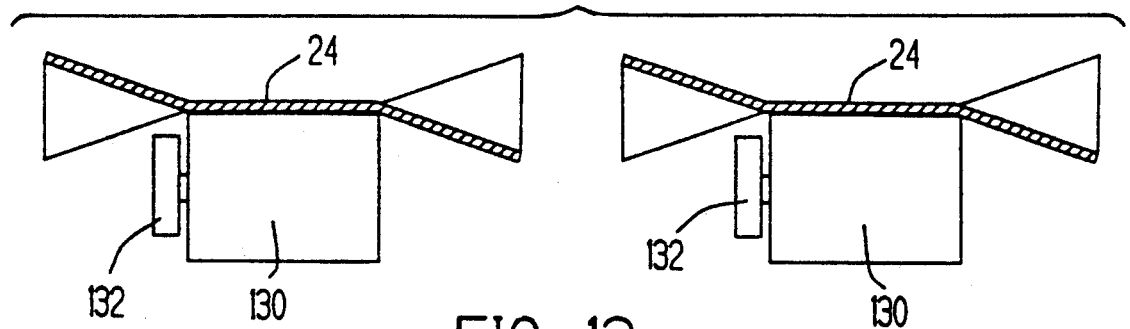
FIG. 13 is cross-sectional front elevation view of another modified support mechanism for extruding a plurality of edge undulated strips.

A modification of the support mechanism for supporting a plurality of dough strips in a horizontal plane is illustrated in FIG. 13. Instead of a single roller each strip, or the central portion thereof, of a plurality of strips 24 is supported by an individual roller 130 mounted on an arm 132 which can be adjusted in a manner similar to that of FIG. 10.

Figure 14:
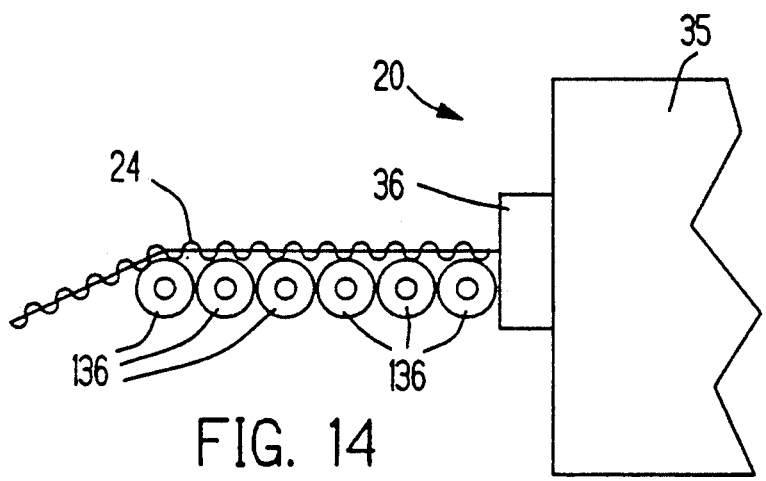
FIG. 14 is a side elevational view of a further variation of the apparatus for producing segmented strip snacks in accordance with the invention.

In another modification of the support mechanism shown in FIG. 14, a series of rollers 136 or rods (not shown) support the strip being extruded. The rollers 136 are closely spaced, one after the other, from the die orifice through a distance insuring additional support for low viscosity materials until the undulations become set.

Figure 15:
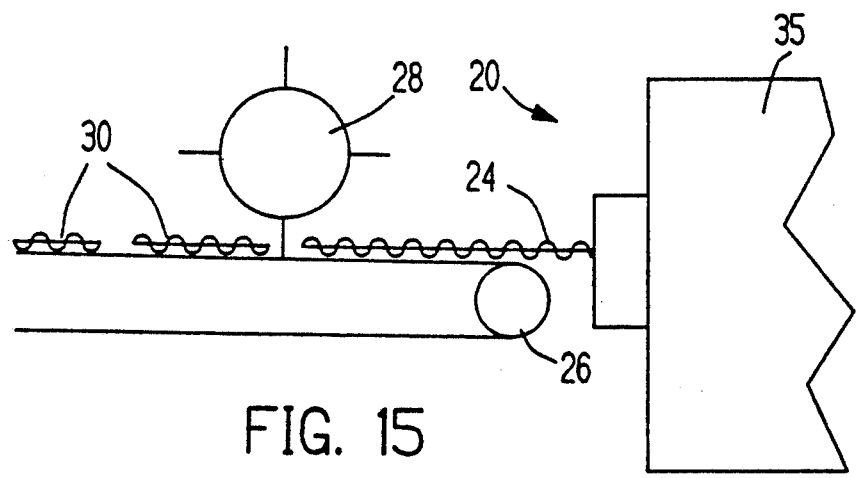
FIG. 15 is a side elevational view of a still further variation of the apparatus for producing segmented strip snacks in accordance with the invention.

In FIG. 15, the cutter conveyor 26 is positioned close to the extrusion orifice(s) so that its extrusion receiving end supports the extruding strip(s) in a horizontal plane until the undulations become set.

Figure 16:
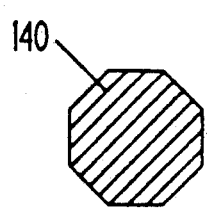
FIG. 16 is a cross-sectional view of a modified roller configuration for supporting a horizontally extruded dough strip.
Figure 17:
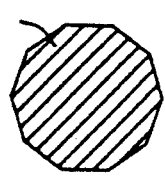
FIG. 17 is a cross-sectional view of a another modified roller configuration for supporting a horizontally extruded dough strip.

As illustrated in FIGS. 16 and 17, the supporting roller or rollers can have polygonal cross-sectional configurations. The cross section of the roller 140 of FIG. 16 is octagonal while the cross section of roller 142 of FIG. 17 is decagonal.

EXAMPLE

A single orifice die in an extrusion apparatus similar to that shown in FIG. 11 had an extrusion passageway similar to that shown in FIGS. 6 and 7. The width 44 of the central portion of the die orifice was 0.53 mm (0.023 inches) and the width 48 of the edge portions of the die orifice was 0.53 mm (0.021 inches). The diameter of the circular terminating portions was 0.74 mm (0.029 inches). The total length of the die orifice was 24.56 mm (0.967 inches), the length of the central portion 42 was 18.24 mm (0.967 inches), and the length of each edge portion was 2.79 mm (0.110 inches). The bores 54 had a diameter of 6.35 mm (0.250 inches) and extended into the back of the die leaving a horizontal run of about 11.13 mm (0.438 inches) for the edge portions 46 of the die passageway. The central portion 42 of the die passageway ran from the rear to the front for a distance of 12.7 mm (0.5 inches). The bar 106 was adjusted during the initial production run to be placed approximately 25.4 mm (one inch) in front of the die with its upper edge just below the orifice so that the extruding strip lies substantially in a horizontal plane from the orifice to the bar. A dough formed from semolina #2 (fine semolina) was extruded through the extrusion apparatus, cut into segments, and then fried for 25 seconds. The product chips had even regular ripples on the side edges.

Since many modifications, variations and changes in detail can be made to the described embodiments, it is intended that the foregoing description be interpreted only as illustrative of examples of the invention, and that many other embodiments can be constructed without departing from the scope and spirit of the invention.

What is claimed is:

1. A method of forming segmented strip snack products with undulating edges, comprising
   extruding a continuous strip of dough in a horizontal plane from an extrusion die with edges of the strip being extruded at a greater velocity than an extrusion velocity of a central portion of the strip so that the edges of the extruded strip become undulated,
   maintaining the extruded strip in the horizontal plane from the extrusion die until the undulations are set on the strip edges with a steady frequency,
   cutting the extruded dough strip into segments, and
   cooking the strip segments to form the segmented strip snack product.

2. A method of forming segmented strip snack products with undulating edges as claimed in claim 1 comprising simultaneously extruding a plurality of continuous strips of dough in a horizontal plane from an extrusion die with edges of the strips being extruded at a greater velocity than an extrusion velocity of central portions of the strips so that the edges of the extruded strips become undulated, maintaining the extruded strips in the horizontal plane from the extrusion die until the undulations are set on the strip edges with a steady frequency, and cutting the extruded dough strips into segments.

3. A method as claimed in claim 1 wherein the strip is maintained in the horizontal plane for a distance of at least one-half period of the undulations.

4. A method as claimed in claim 1 wherein the strip is maintained in the horizontal plane for a distance of at least two periods of the undulations.

5. A method as claimed in claim 1 wherein the maintaining of the strip in the horizontal plane is performed by supporting the strip with a cylindrical member have its axis disposed transverse to the strip.

6. A method as claimed in claim 5 wherein the strip is maintained in the horizontal plane by a roller.

* * * * *